(12) United States Patent
Fukunaga (10) Patent No.: US 8,155,443 B2
(45) Date of Patent: Apr. 10, 2012

(54) IMAGE EXTRACTING APPARATUS, IMAGE EXTRACTING METHOD AND COMPUTER READABLE MEDIUM

(75) Inventor: Masakazu Fukunaga, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 738 days.

(21) Appl. No.: 12/265,214

(22) Filed: Nov. 5, 2008

(65) Prior Publication Data
US 2009/0257658 A1    Oct. 15, 2009

(30) Foreign Application Priority Data

Apr. 9, 2008   (JP) .................................. 2008-101861

(51) Int. Cl.
*G06K 9/34* (2006.01)
(52) U.S. Cl. ........................................ 382/173
(58) Field of Classification Search .................. None
See application file for complete search history.

(56) References Cited

U.S. PATENT DOCUMENTS

| | | | |
|---|---|---|---|
| 5,054,098 A * | 10/1991 | Lee | 382/289 |
| 5,491,759 A | 2/1996 | Nagao et al. | |
| 5,515,181 A * | 5/1996 | Iyoda et al. | 358/474 |
| 5,828,771 A * | 10/1998 | Bloomberg | 382/112 |
| 6,298,157 B1 | 10/2001 | Wilensky | |
| 6,738,154 B1 * | 5/2004 | Venable | 358/1.15 |
| 6,999,209 B2 * | 2/2006 | Kelly et al. | 358/474 |
| 7,058,224 B2 | 6/2006 | Herley | |
| 7,119,807 B2 * | 10/2006 | Matsui | 345/468 |
| 7,184,589 B2 * | 2/2007 | Okubo | 382/166 |
| 7,515,772 B2 * | 4/2009 | Li et al. | 382/289 |
| 7,912,295 B1 * | 3/2011 | Chien | 382/199 |
| 7,970,231 B2 * | 6/2011 | Tamura et al. | 382/266 |
| 8,009,931 B2 * | 8/2011 | Li et al. | 382/289 |
| 2004/0264793 A1 * | 12/2004 | Okubo | 382/243 |
| 2008/0137961 A1 * | 6/2008 | Ishida et al. | 382/197 |

FOREIGN PATENT DOCUMENTS

| | | |
|---|---|---|
| JP | A-6-162190 | 6/1994 |
| JP | A-07-089063 | 4/1995 |
| JP | A-2001-157018 | 6/2001 |
| JP | A-2001-298588 | 10/2001 |
| JP | A-2002-010059 | 1/2002 |

OTHER PUBLICATIONS

Japanese Office Action issued in Japanese Patent Application No. 2008-101861; mailed on Feb. 9, 2010 (with English translation).

* cited by examiner

*Primary Examiner* — Yuzhen Ge
(74) *Attorney, Agent, or Firm* — Oliff & Berridge, PLC (57) ABSTRACT

An image extracting method includes: acquiring a scan image; generating a binary image of the acquired scan image and detects connected pixels in the generated binary image; setting up a circumscribed rectangle for the detected connected pixels; performing, in each side of a circumscribed rectangle, scan in a direction perpendicular to the side so as to detect edge pixels, wherein the scan starts at a plurality of points on a line, and the line extends to one vertex of the side, from a contacting point at which the connected pixels and the side contact; determining whether the detected edge pixels are located in a contour part of the object reproduced in the scan image; setting up a rectangular region based on the edge pixels determined as being located in the contour part of the object; and extracting an image from the set-up rectangular region.

10 Claims, 6 Drawing Sheets

IMAGE EXTRACTING APPARATUS, IMAGE EXTRACTING METHOD AND COMPUTER READABLE MEDIUM

CROSS-REFERENCE TO RELATED APPLICATIONS

This application is based on and claims priority under 35 USC 119 from Japanese Patent Application No. 2008-101861 filed Apr. 9, 2008.

BACKGROUND

1. Technical Field

The present invention relates to an image extracting apparatus, an image extracting method and a computer readable medium.

2. Related Art

Techniques for separating and extracting each document image from a scan image obtained by simultaneously scanning one or a plurality of documents have been known.

SUMMARY

According to an aspect of the invention, an image extracting apparatus includes an image acquiring section, a detecting section, a circumscribed rectangle setting section, an edge pixel detecting section, a determining section and a rectangular region setting section. The image acquiring section acquires a scan image obtained by scanning an object. The detecting section that generates a binary image of the acquired scan image and detects connected pixels in the generated binary image. The circumscribed rectangle setting section sets up a circumscribed rectangle for the connected pixels detected by the detecting section. The edge pixel detecting section that, in each side of a circumscribed rectangle, performs scan in a direction perpendicular to the side so as to detect edge pixels, wherein the scan starts at a plurality of points on a line, and the line extends to one vertex of the side, from a contacting point at which the connected pixels and the side contact. The determining section that determines whether the edge pixels detected by the edge pixel detecting section are located in a contour part of the object reproduced in the scan image. The rectangular region setting section sets up a rectangular region based on the edge pixels determined as being located in the contour part of the object. The image extracting section extracts an image from the rectangular region set up by the rectangular region setting section.

BRIEF DESCRIPTION OF THE DRAWINGS

Exemplary embodiment(s) of the present invention will be described in detail based on the following figures, wherein.

DETAILED DESCRIPTION

An exemplary embodiment for implementing the present invention is described below with reference to the drawings.

Figure 1:
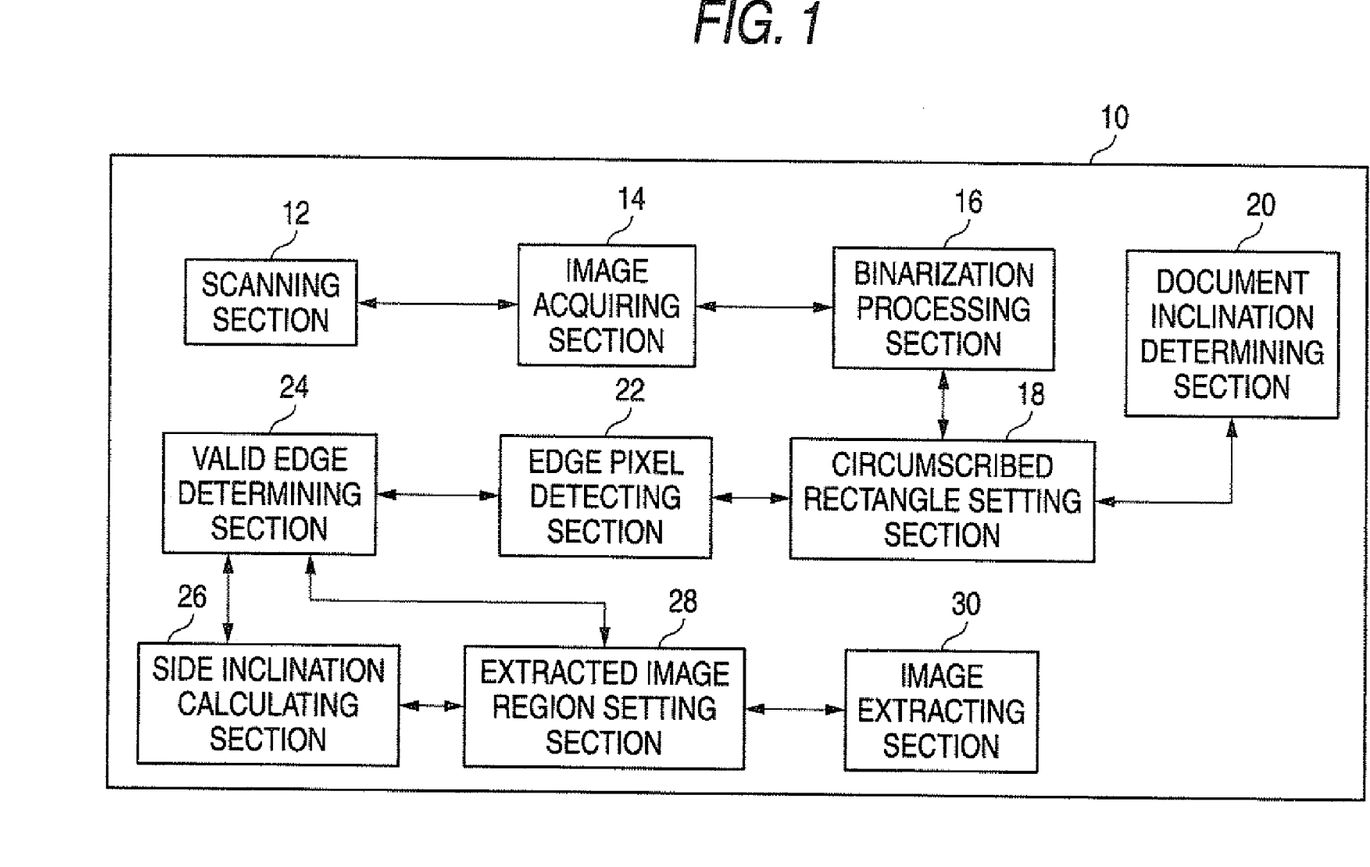
FIG. 1 is a functional block diagram showing an image extracting apparatus 10 according to an exemplary embodiment of the present invention.

FIG. 1 is a functional block diagram showing an image extracting apparatus 10 according to the present exemplary embodiment. The image extracting apparatus 10 according to the present exemplary embodiment is applied to a multifunction printer (combined machine) having a scanning function. However, this apparatus may be applied to an information processing device such as a personal computer to which a scanner is connected. In the present exemplary embodiment, the image extracting apparatus 10 performs the processing of extracting an image of each document from a scan image obtained by simultaneously scanning one or a plurality of document sheets (such as business cards and letters). Details of the functions provided in the image extracting apparatus 10 are described below.

As shown in FIG. 1, the image extracting apparatus 10 includes a scan section 12, an image acquiring section 14, a binarization processing section 16, a circumscribed rectangle setting section 18, a document inclination determining section 20, an edge pixel detecting section 22, a valid edge determining section 24, a side inclination calculating section 26, an extracted image region setting section 28, and an image extracting section 30. The functions of the individual sections may be implemented when an image extracting program stored in a computer-readable information storage medium is read by a medium reader (not shown) into the image extracting apparatus 10 constructed in the form of a computer system and then the program is executed by the image extracting apparatus 10. However, in contrast to this example where the program is provided from an information storage medium to the image extracting apparatus 10, the image extracting program may be downloaded from a remote site to the image extracting apparatus 10 via a data communication network such as the Internet.

The scan section 12 includes an optical reader, and scans by optical processing a document placed at a predetermined image reading position of the optical reader so as to generate a scan image of the document. The number of document sheets contained in the scan image may be unity or a plural number.

The image acquiring section 14 acquires the scan image generated by the scan section 12. When the scan section 12 is constructed as an external device, the image acquiring section 14 acquires the scan image via an interface of USB type or the like.

The binarization processing section 16 performs binarization processing on the scan image acquired by the image acquiring section 14, so as to generate a binary image of the scan image. In the binarization processing section 16, binarization processing for emphasizing the edges in the scan image is performed such as to permit easier extraction of a contour part of the document contained in the scan image.

The circumscribed rectangle setting section 18 imparts a label to each group of connected pixels of black contained in the binary image generated by the binarization processing section 16 (labeling processing, and then sets up a circumscribed rectangle for each group of connected pixels to which the label has been imparted. The processing performed by the circumscribed rectangle setting section 18 is described below in detail with reference to FIG. 2.

Figure 2:
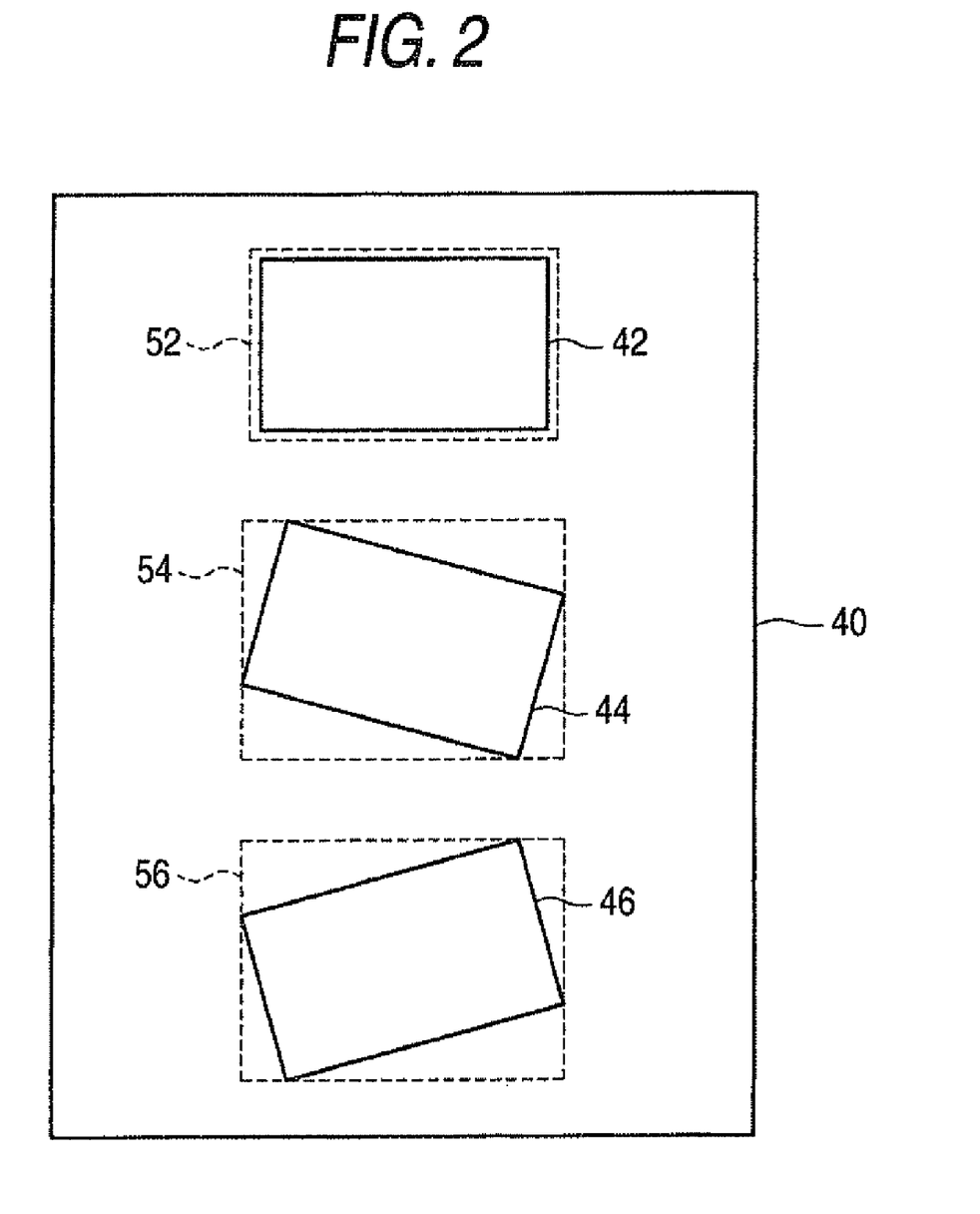
FIG. 2 is a diagram showing an example of circumscribed rectangles set up for individual connected pixel groups contained in a binary image.

FIG. 2 is an example of circumscribed rectangles set up by the circumscribed rectangle setting section 18 for the individual groups of connected pixels contained in the binary image of the scan image. In the example shown in FIG. 2, the binary image 40 contains three document images. Here, the circumscribed rectangle setting section 18 sets up circumscribed rectangles 52, 54, and 56 respectively for connected pixel groups 42, 44, and 46 that indicate the contour edges of the document images contained in the binary image 40.

The document inclination determining section 20 determines whether the connected pixels (a document image) contained within the region of the circumscribed rectangle set up by the circumscribed rectangle setting section 18 for each connected pixel group is inclined relative to the set-up circumscribed rectangle. As for a document image determined by the document inclination determining section 20 as not inclined relative to the circumscribed rectangle, the region of the circumscribed rectangle is set up as an image region that contains the document image. On the other hand, as for a document image determined as inclined relative to the circumscribed rectangle, as describes below, a contour part of the document image is detected in the circumscribed rectangle, and then the region surrounded by the contour of the document image is set up as an extracted image region of the document image. Details of this processing of setting up an extracted image region for an inclined document image is described later.

Figure 3:
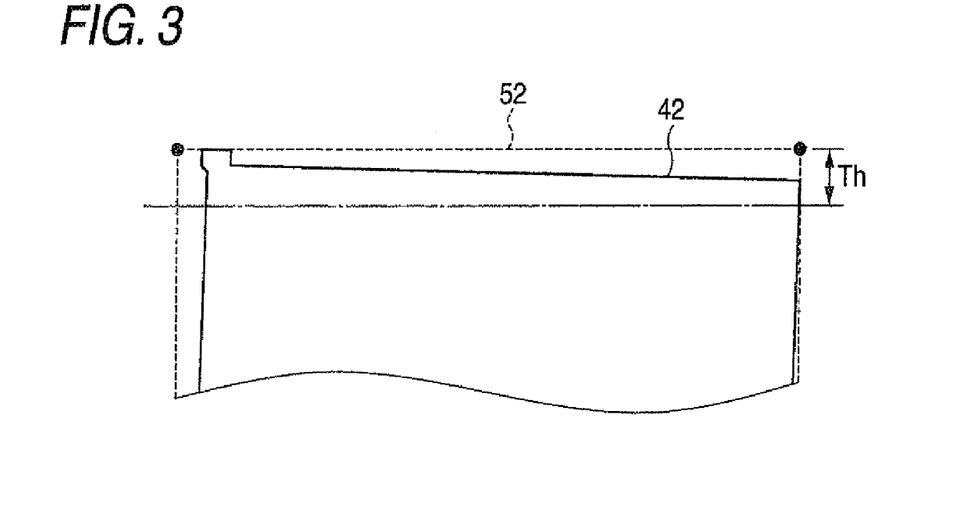
FIG. 3 is a diagram showing an example of a determination criterion of whether a document image is inclined.

Here, an example of determination criterion of whether a document image is inclined or not that is used in the document inclination determining section 20 is described below with reference to FIG. 3. As shown in FIG. 3, the document inclination determining section 20 determines that when in each side of the circumscribed rectangle 52, the distance from one side of the circumscribed rectangle 52 to one side constituted from connected pixels 42 close to the side falls within a predetermined value (Th), the document image contained in the circumscribed rectangle is not inclined. When the above-mentioned condition is not satisfied, the document image is determined as being contained in an inclined state in the scan image. The above-mentioned value Th may be set up in advance for each value of the side length.

From the image region within each circumscribed rectangle set up by the circumscribed rectangle setting section 18, the edge pixel detecting section 22 detects edge pixels of the document image in accordance with a rule described below. That is, the edge pixel detecting section 22 first selects one circumscribed rectangle side as a processing target. Then, starting at each of a plurality of points on the line segment extending from the point in contact with the connected pixels on the side to the more distant vertex, the edge pixel detecting section 22 performs scan in a direction perpendicular to the side, and then recognizes as the edge pixel a pixel detected first. The above-mentioned plurality of points may be taken, for example, in each pixel on the line segment or alternatively at predetermined intervals.

Figure 4:
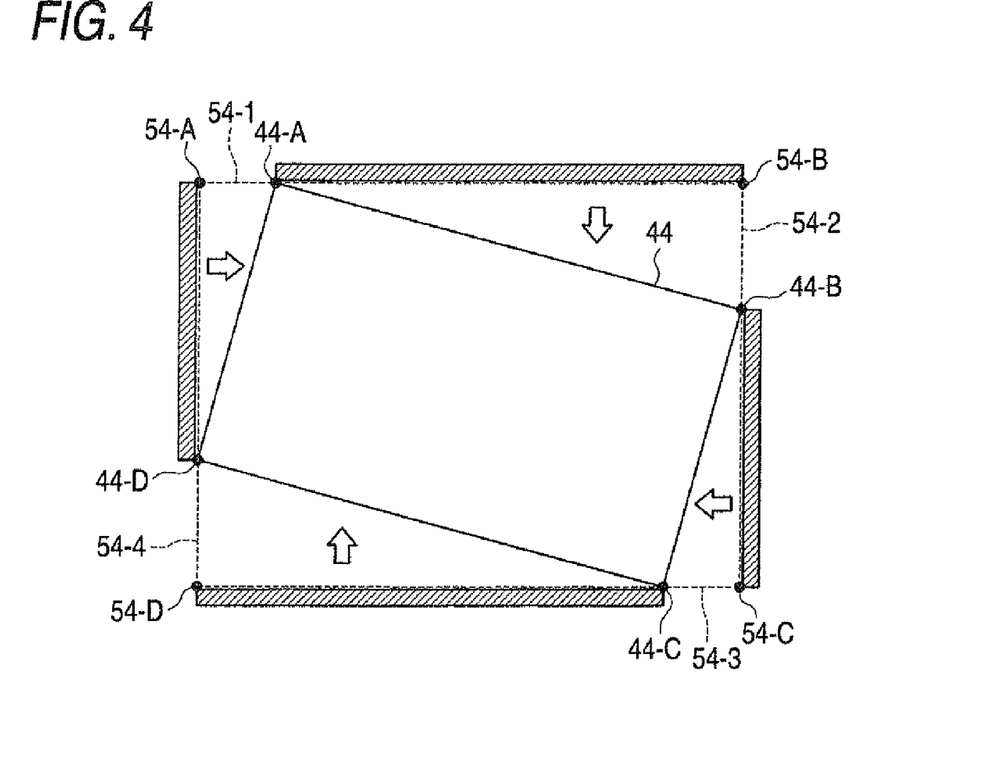
FIG. 4 is a diagram showing an example of connected pixels and a circumscribed rectangle.

The processing performed by the edge pixel detecting section 22 is described below in detail with reference to FIG. 4. The edge pixel detecting section 22 first performs the following processing on the upper side 54-1 of the circumscribed rectangle 54 with starting at the contact point 44-A with the connected pixels 44 to the vertex more distant from 44-A, that is, to the vertex 54-B. First, the edge pixel detecting section 22 records the position coordinates of the contact point relative to the contact point 44-A serving as the origin, then after moving by a predetermined number of pixels (for example, 1 pixel) in the direction to 54-B, performs scan starting at that point in a direction perpendicular to the upper side 54-1 so as to detect a black pixel, and then records the position coordinates of the detected black pixel. The black pixels detected as such are adopted as the edge pixels. The edge pixel detecting section 22 performs the above-mentioned processing repeatedly from the contact point 44-A to the vertex 54-B. Then, similar processing is performed also on each of the sides 54-2, 52-3 and 52-4 so that the position coordinates of the edge pixels are obtained for each side. Here, since noise can be contained in the scan image in some cases, the detected edge pixels described above do not always constitute the contour part of the document image. Thus, in the present exemplary embodiment, the function described below is provided for improving the image extraction accuracy by selecting edge pixels having a higher probability of constituting a contour part from among the edge pixels.

The valid edge determining section 24 determines whether the edge pixels detected by the edge pixel detecting section 22 are located in a contour part of the document image. The edge pixels determined by the valid edge determining section 24 as being located in a contour part of the document image are adopted as valid edge pixels. The valid edge determining section 24 determines that when an edge pixel satisfies any one of the following three determination criteria, the edge pixel is not located in a contour part of the document image, that is, the edge pixel is not a valid edge pixel. In contrast, an edge pixel does not satisfy any one of the determination criteria is determined as a valid edge pixel.

The first determination criterion is that an edge pixel detected at a position exceeding a diagonal line of the circumscribed rectangle from the circumscribed rectangle side serving as the start point of the scan is not adopted as a valid edge pixel. This is because when the four sides of the rectangular document image are reproduced appropriately in the scan image, a side of the document image cannot be detected at a position exceeding a diagonal line. In addition, this diagonal line faces the vertex of the circumscribed rectangle which is more distant from the contact point. For example, the diagonal line including the vertices 54-A and 54-C faces the vertex 54-B which is more distant from the contact point 44-A.

The second determination criterion is that an edge pixel whose positional difference from the adjacent edge pixels is greater than a predetermined positive value is not adopted as a valid edge pixel. This is because in the present exemplary embodiment, the respective sides of the circumscribed rectangle and the document image are in a relation of smoothly inclined pair. Thus, when a sudden positional difference is detected, it is expected as noise at a high probability.

The third determination criterion is that when an edge pixel approaches the circumscribed rectangle side rather than an edge pixel adjacent on the contact point side, the edge pixel is not adopted as a valid edge pixel. This is because in the present exemplary embodiment, when moving from the contact point on the circumscribed rectangle side to the vertex, the detected edge pixel should become distant from the circumscribed rectangle side. On the contrary, an edge pixel approaching the circumscribed rectangle side is determined as having a high possibility of being noise.

The situation that when various kinds of noise are contained in the scan image each of the above-mentioned determination criteria improves the noise tolerance in identifying the region of a document image is described below with reference to the example shown in FIG. 5A to 5C.

Figure 5A:
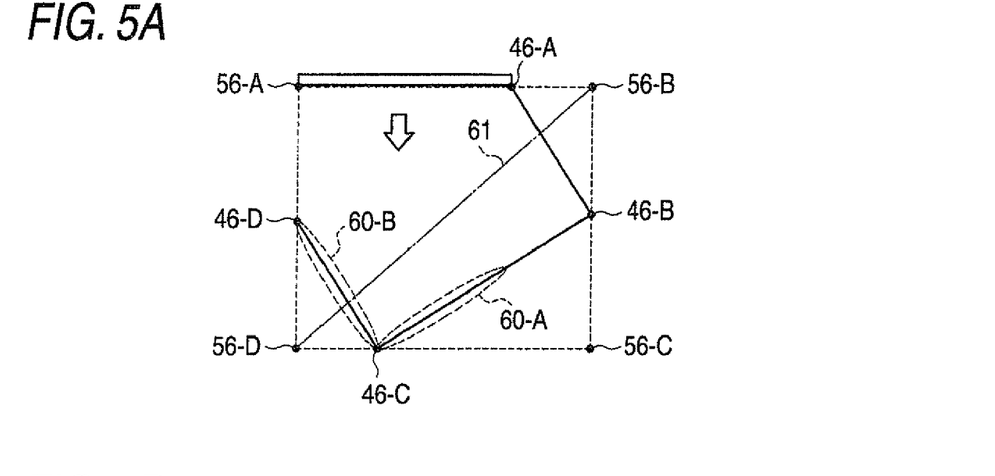
FIG. 5A, FIG. 5B and FIG. 5C are diagrams describing improvement in noise tolerance in identifying the region of a document image.

In the example shown in FIG. 5A, the edge in the upper part of the document image is assumed to be missing. At this time, edge pixels detected in correspondence to the circumscribed rectangle upper side are 60-A and 60-B. However, the edge pixels of 60-A are detected at a position exceeding the diagonal line 61, and hence not determined as valid edge pixels according to the first determination criterion. The edge pixels 60-B approach the upper side when approaching the vertex 56-A, and hence are not determined as valid edge pixels according to the third determination criterion.

Figure 5B:
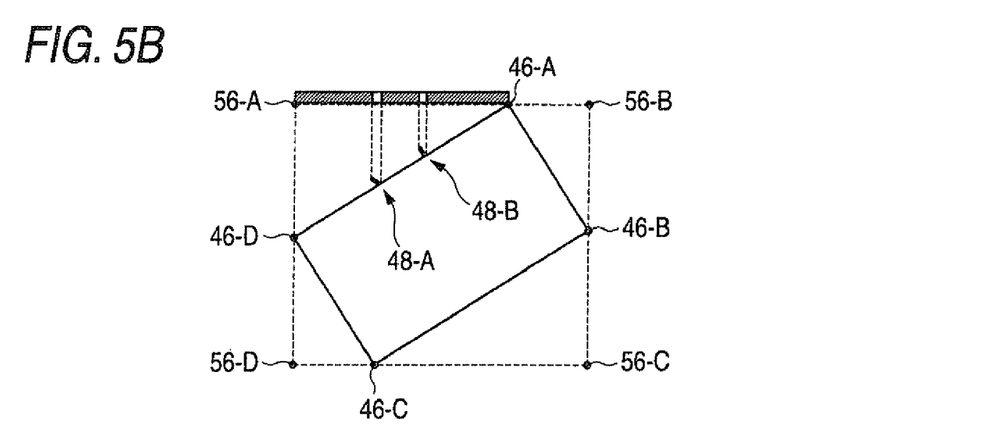

In the example shown in FIG. 5B, protrusions 48-A and 48-B are assumed to be added as noise in a part of a side of the document image. At this time, the protrusions 48-A and 48-B are detected as edge pixels, respectively. However, each of the protrusions 48-A and 48-B has a large positional difference from the adjacent edge pixels, and further is closer to the upper side than the edge pixels detected on the vertex 56-B side. Thus, they are not determined as valid edge pixels according to the second or the third determination criterion.

Figure 5C:
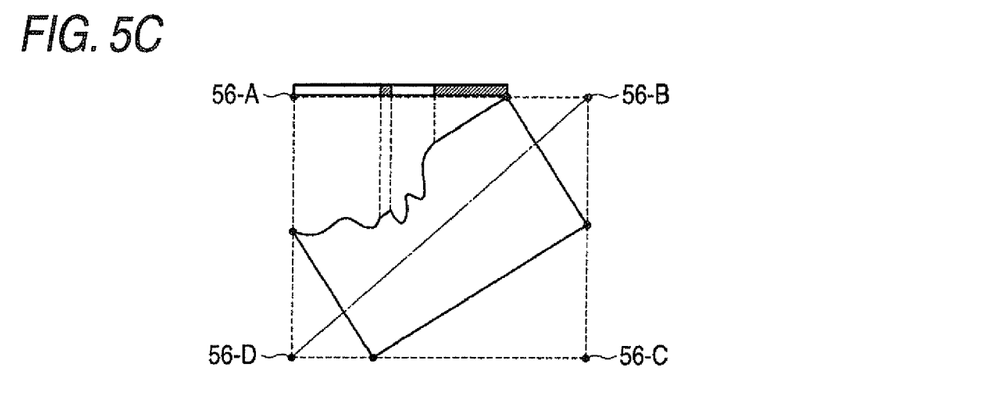

In the example shown in FIG. 5C, an inside part of the document image is assumed to be adopted as an edge in the binarization processing. At this time, a part of the edge pixels that deeply enter the inside of the document image have a large positional fluctuation, and further approach the upper side when approaching the vertex 56-A. Thus, they are not determined as valid edge pixels according to the second and the third determination criteria.

As described above, on the basis of the first to the third criteria described above, edge pixels not located in a contour part of a document image are eliminated from those detected as edge pixels. By virtue of this, edge pixels located in a contour part of the document image can exclusively be selected as valid edge pixels.

On the basis of the position coordinates of the black pixels determined as valid edge pixels by the valid edge determining section 24, the side inclination calculating section 26 calculates the inclination of each side constituted from these valid edge pixels. The side inclination calculating section 26 recognizes as one group the valid edge pixels acquired in correspondence to a circumscribed rectangle side, then specifies a line segment for each group by the least square method or the like, and then calculates the inclination of each specified line segment relative to the corresponding side of the circumscribed rectangle.

On the basis of the coordinates of the sides constituted from the valid edge pixels and the conformity in the inclinations of the individual sides constituted from the valid edge pixels calculated by the side inclination calculating section 26, the extracted image region setting section 28 sets up an extracted image region which is a rectangular region where the document image is reproduced. Here, the extracted image region is not limited to the inside of the circumscribed rectangle set up by the circumscribed rectangle setting section 18, and may extend even to the outside of the circumscribed rectangle. Here, the processing of setting up an extended extracted image region described above is described below with reference to FIGS. 6A and 6B.

Figure 6A:
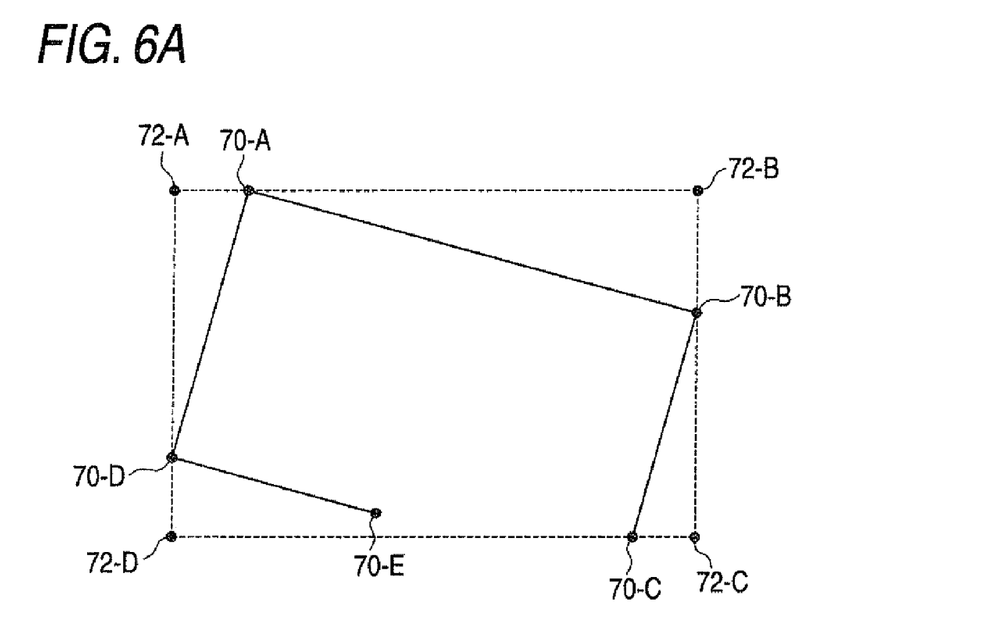
FIG. 6A and FIG. 6B are diagrams showing a processing of setting up an extended extracted image region.
Figure 6B:
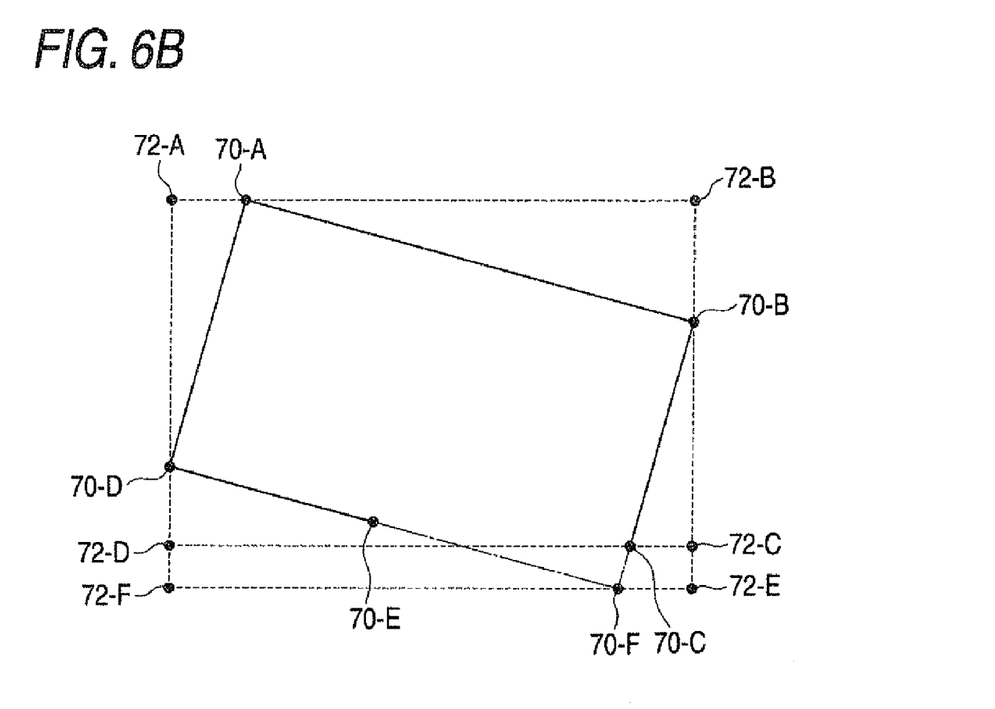

FIG. 6A shows a situation that a circumscribed rectangle (the rectangle indicated by vertex 72-A, 72-B, 72-C, 72-D) is set up for a binary image (the connected pixels formed by linking the vertices 70-A, 70-B, 70-C, 70-D, 70-E) in which a part of the contour is lost. Here, the above-mentioned processing is performed on the circumscribed rectangle image so that valid edge pixels are acquired. Here, when the conformity in the inclinations of the individual sides is confirmed, as shown in FIG. 6B, connected pixels are extended such that the length of the opposing side should agree with the length of the longer side. As a result, an extracted image region (the rectangular region obtained by connecting the vertices 70-A, 70-B, 70-F, 70-D) is set up.

The image extracting section 30 extracts an image from the rectangular region set up by the extracted image region setting section 28.

Next, the flow of image extracting processing performed by the image extracting apparatus 10 according to the present exemplary embodiment is described below with reference to the flow chart shown in FIG. 7.

Figure 7:
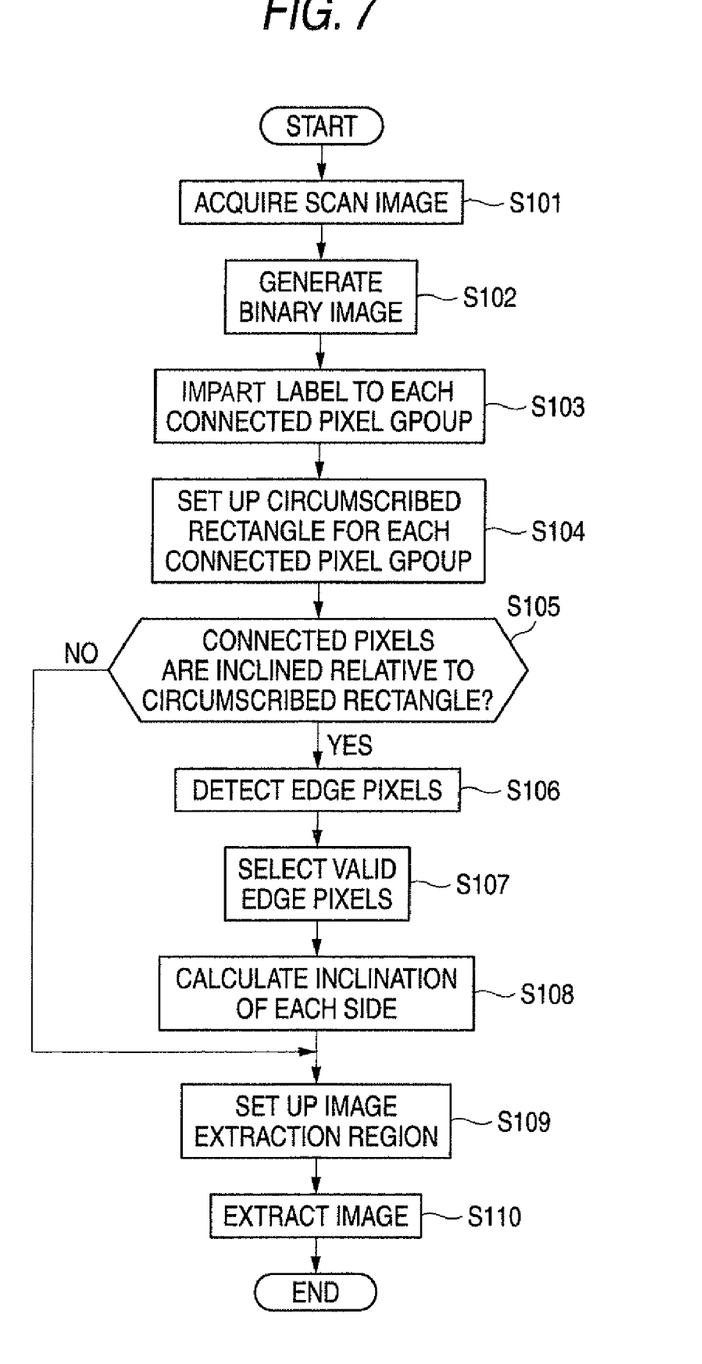
FIG. 7 is a flow chart showing a flow of image extracting processing performed by an image extracting apparatus 10.

As shown in FIG. 7, the image extracting apparatus 10 reads one or a plurality of document sheets placed on an image reading section, so as to generate and acquire a scan image (S101). The image extracting apparatus 10 performs binarization processing for emphasizing the edge onto the acquired scan image, so as to generate a binary image (S102). The image extracting apparatus 10 imparts a label to each connected pixel group contained in the generated binary image (S103), and then sets up a circumscribed rectangle for each connected pixel group to which the label has been imparted (S104).

For each set-up circumscribed rectangle, the image extracting apparatus 10 determines whether the connected pixels contained in the circumscribed rectangle are inclined relative to the circumscribed rectangle (S105). Here, as for a circumscribed rectangle determined as not inclined, the circumscribed rectangle is set up as an extracted image region (S109). On the other hand, as for a circumscribed rectangle determined as inclined, the following processing is performed.

For each circumscribed rectangle side, the image extracting apparatus 10 performs scan in a direction perpendicular to the side with starting at each point on the line extending from the point of contact with the connected pixels to the vertex more distant from the point of contact, so as to detect edge pixels (S106). From the detected edge pixels, the image extracting apparatus 10 selects valid edge pixels that constitute the contour part of the document image (S107).

The image extracting apparatus 10 performs the above-mentioned detection processing for valid edge pixels onto each circumscribed rectangle side, and then calculates the inclination of each side constituted from the obtained valid edge pixels (S108). Then, the image extracting apparatus 10 sets up a rectangular extracted image region on the basis of the conformity between the sides constituted from the valid edge pixels and the inclinations calculated for the individual sides (S109). The image extracting apparatus 10 performs the above-mentioned processing on each circumscribed rectangle so as to extract an image in each set-up rectangular region (S110). As a result, individual document images reproduced in the scan image are extracted.

As described above, according to the image extracting apparatus 10 described in the present exemplary embodiment, noise tolerance is improved in extracting rectangle images such as rectangle documents from a scan image.

Here, the present invention is not limited to the above-mentioned exemplary embodiment. That is, obviously, various changes, modifications, and substitutions can be made by a person skilled in the art who has ordinary knowledge in this field.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image extracting apparatus comprising:
an image acquiring section that acquires a scan image obtained by scanning an object;
a detecting section that generates a binary image of the acquired scan image and detects connected pixels in the generated binary image;
a circumscribed rectangle setting section that sets up a circumscribed rectangle for the connected pixels detected by the detecting section;
an edge pixel detecting section that, in each side of the circumscribed rectangle, performs a scan in a direction perpendicular to a side of the circumscribed rectangle so as to detect edge pixels, wherein the scan starts at a plurality of points on a line, and the line extends to one vertex of the circumscribed rectangle from a contacting point at which the connected pixels and the side of the circumscribed rectangle contact;
a determining section that determines whether the edge pixels detected by the edge pixel detecting section are located in a contour part of the object reproduced in the scan image;
a rectangular region setting section that sets up a rectangular region based on the edge pixels determined as being located in the contour part of the object; and
an image extracting section that extracts an image from the rectangular region set up by the rectangular region setting section.

2. The image extracting apparatus according to claim 1, wherein the determining section determines that, among the detected edge pixels, an edge pixel at a position exceeding a diagonal line of the circumscribed rectangle are not located in the contour part of the object.

3. The image extracting apparatus according to claim 1, wherein the determining section determines that, among the detected edge pixels, an edge pixel whose distance to an adjacent edge pixel is greater than a threshold value is not located in the contour part of the object.

4. The image extracting apparatus according to claim 1, wherein the determining section determines that detected edge pixels are not located in the contour part of the object when distances from the detected edge pixels to the side of the circumscribed rectangle decrease as the detected pixels approach the one vertex from the contacting point.

5. The image extracting apparatus according to claim 1, wherein the one vertex is more distant from the contacting point among vertices of the side of the circumscribed rectangle.

6. The image extracting apparatus according to claim 1, further comprising:
a inclination calculating section that, based on position coordinates of the edge pixels as being the pixels located in the contour part of the object, calculates inclinations of at least three or more line segments constituted by the edge pixels as being the pixels located in the contour part of the object,
wherein the rectangular region setting section sets up the rectangular region based on conformity in the calculated inclinations of the line segments.

7. The image extracting apparatus according to claim 1, further comprising:
another inclination calculating section that detects an inclination between the detected connected pixels and the circumscribed rectangle,
wherein, when the detected inclination is greater than a predetermined value, processing is executed by the edge pixel detecting section, the determining section, and rectangular region setting section.

8. The image extracting apparatus according to claim 1, wherein the object is a rectangular document image.

9. An image extracting method comprising:
acquiring a scan image obtained by scanning an object;
generating a binary image of the acquired scan image and detects connected pixels in the generated binary image;
setting up a circumscribed rectangle for the detected connected pixels;
performing, in each side of the circumscribed rectangle, a scan in a direction perpendicular to a side of the circumscribed rectangle so as to detect edge pixels, wherein the scan starts at a plurality of points on a line, and the line extends to one vertex of the circumscribed rectangle from a contacting point at which the connected pixels and the side of the circumscribed rectangle contact;
determining whether the detected edge pixels are located in a contour part of the object reproduced in the scan image;
setting up a rectangular region based on the edge pixels determined as being located in the contour part of the object; and
extracting an image from the set-up rectangular region.

10. A non-transitory computer readable medium storing a program causing a computer to execute a process for extracting images, the process comprising:
acquiring a scan image obtained by scanning an object;
generating a binary image of the acquired scan image and detects connected pixels in the generated binary image;
setting up a circumscribed rectangle for the detected connected pixels;
performing, in each side of the circumscribed rectangle, a scan in a direction perpendicular to a side of the circumscribed rectangle so as to detect edge pixels, wherein the scan starts at a plurality of points on a line, and the line extends to one vertex of the circumscribed rectangle from a contacting point at which the connected pixels and the side of the circumscribed rectangle contact;
determining whether the detected edge pixels are located in a contour part of the object reproduced in the scan image;
setting up a rectangular region based on the edge pixels determined as being located in the contour part of the object; and
extracting an image from the rectangular region set up.

* * * * *